May 20, 1958   E. S. ROBBINS   2,834,984
VULCANIZING APPARATUS
Filed March 31, 1955   3 Sheets-Sheet 1
Fig. 1
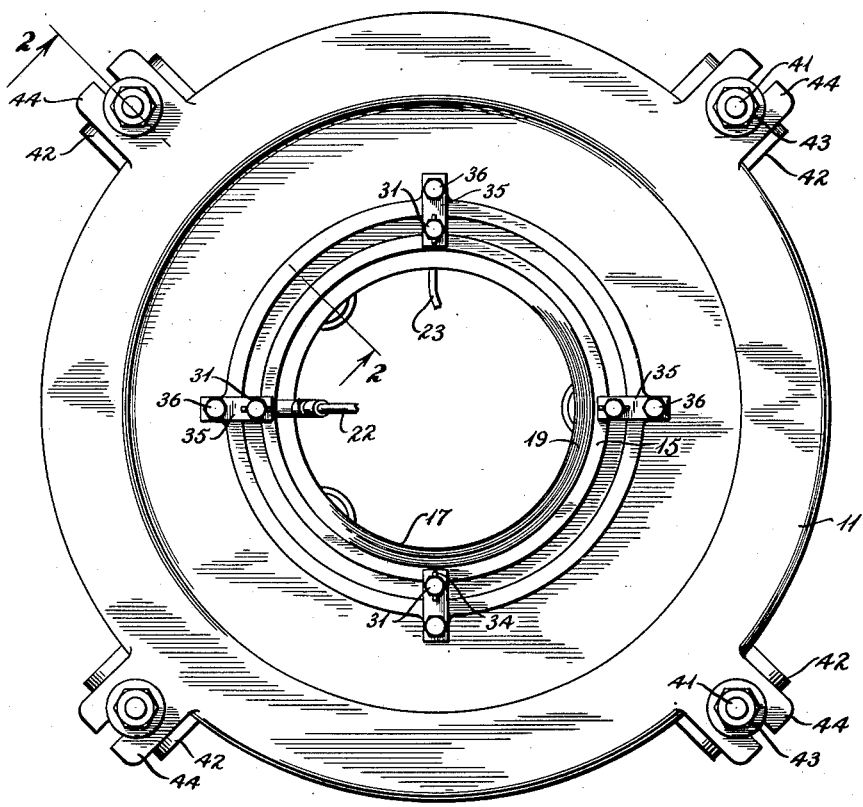
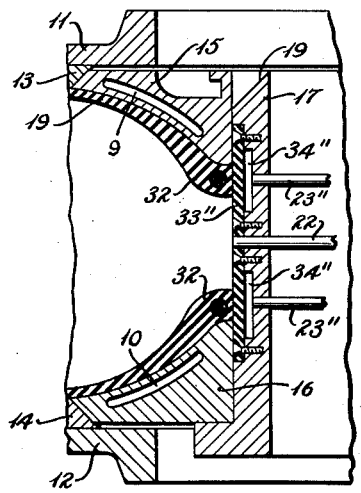
Fig. 4
INVENTOR
Edward Stanley Robbins
BY Beale & Jones
ATTORNEYS

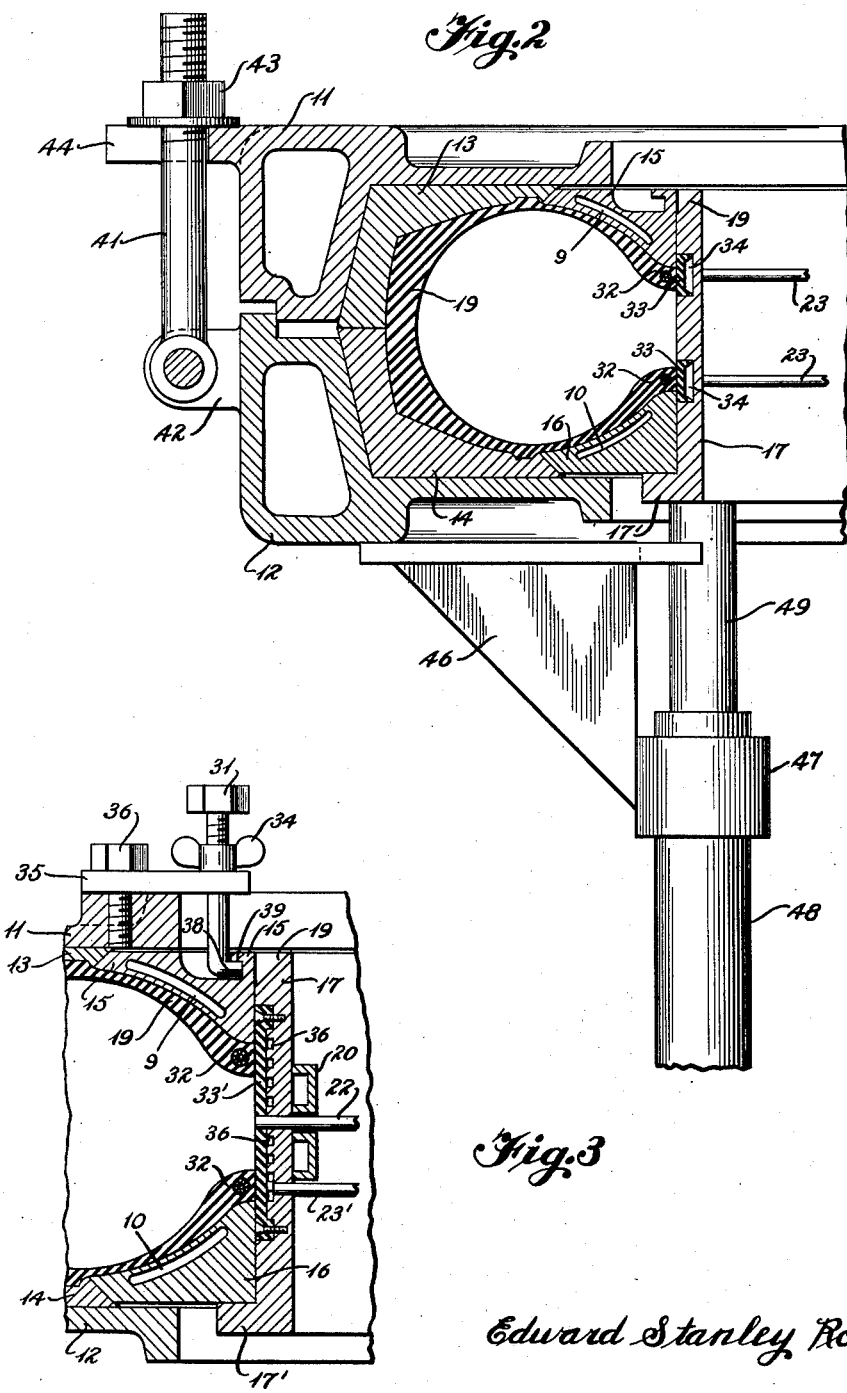

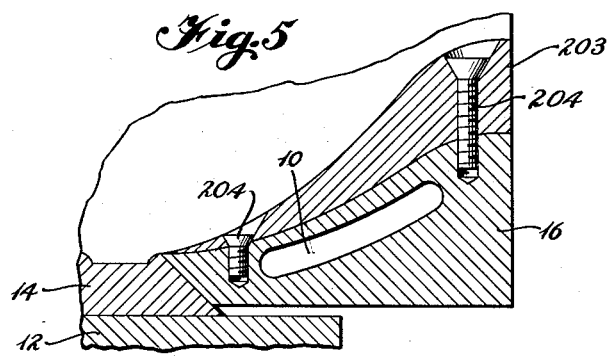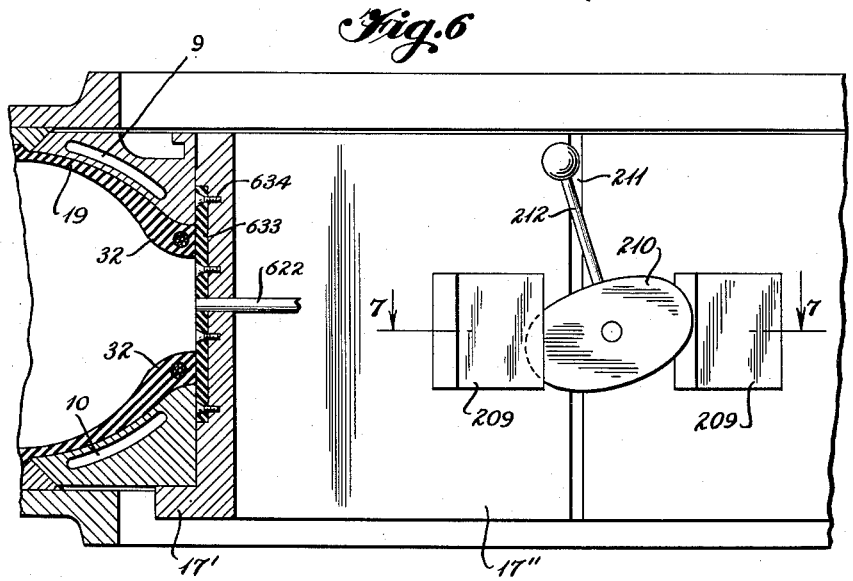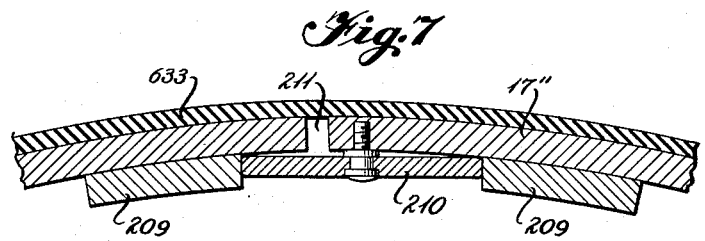

United States Patent Office 2,834,984
Patented May 20, 1958

2,834,984

VULCANIZING APPARATUS

Edward S. Robbins, Killen, Ala., assignor, by mesne assignments, to Robbins Tire and Rubber Company, Inc., Tuscumbia, Ala., a corporation of Alabama Application March 31, 1955, Serial No. 498,320

13 Claims. (Cl. 18—18)

This invention relates to improvements in molds for retreading or recapping tubeless tires. Where the expression "recapping" is employed in this specification, it should be understood to encompass all similar types of operations, wherein raw rubber is vulcanized to a used tire carcass to extend its life.

Although recapping processes have become widely used in recent years, the technology of recapping has not advanced as rapidly as the popularity of the process. A principal disadvantage of present recapping techniques is the amount of strenuous labor involved. The amount of strenuous physical labor, together with the undesirable working conditions created by the high temperatures required for vulcanization, have created a serious labor problem in the recapping industry.

An object of the present invention is to provide a simplified molding process and apparatus which will require less heavy labor during the recapping process than has been necessary with conventional recapping techniques.

Another object of the invention is to provide a recapping process and apparatus for use with tubeless tires, in which a pneumatic seal is obtained between an expansible cylindrical rim and the bead portions of the tire carcass. Pneumatic sealing between the beads of the carcass and an expansible rim is possible only with modern tubeless tires which have a leak-proof lining and are air tight. The conventional pneumatic tire, which is designed for use with a separate tube, is not air tight and usually would not be suitable for use in the present process.

Still another object of the invention is to provide a recapping process and apparatus in which the recapping operation may be completed in a much shorter time and at much higher pressure than is possible in other types of recapping processes.

A further object of the invention is to provide an improved recapping apparatus in which proper alignment of the tire carcass within the mold is inherently obtained through ordinary, careful use of the apparatus.

These and other objects of the invention are achieved by an improved form of the well-known clamshell type of molding equipment. In this improved apparatus, an expansible cylindrical rim is provided having a flat exterior surface whose diameter is just large enough to allow freedom of movement into, and easy withdrawal from, a tire carcass. The improved clamshell mold desirably consists of conventional upper and lower back mold pieces having modified matrices therein, each matrix being shortened so as to cover only the portion of the carcass to which new rubber is being applied. This structure provides for engaging and supporting a sidewall member which embraces the sidewalls of the carcass and affords support for all of the exterior surface of the tire. After inserting the cylindrical rim within the tire carcass, the surface of the rim is expanded into engagement with the innermost surface of the bead portions of the carcass. The expanded surface element of the rim making this contact is of sufficiently resilient material that a good pneumatic seal may be obtained in this way, between the carcass and the surface element of the rim. The insertion of the rim within the carcass, and the expansion of the surface element completes the enclosure of the carcass within the mold, and provides sufficient support for the carcass so that unusually high pressures may be employed inside the carcass to force it into engagement with the mold.

The cylindrical rim is desirably mounted on hydraulic mechanisms in such a way that it is movable axially with respect to the mold and tire carcass, and is preferably chamfered at its upper extremity in order that the tire may be slipped over the rim easily. In order to insert a tire in the mold, the upper and lower mold halves are separated, and the cylindrical rim is dropped down so that it is almost clear of the lower half of the mold. The tire carcass is then placed in the lower half of the mold, the cylindrical rim is raised into place, and the upper half of the mold is dropped down. The tire carcass is thus completely embraced within the mold, with the bead portions of the tire abutting the exterior surface of the cylindrical rim in loose engagement therewith. In order to remove the tire carcass from the mold after vulcanizing is complete, the mold is broken apart and the upper mold half is separated from the lower half. The carcass will ordinarily remain in the lower half of the mold. The cylindrical rim and the lower sidewall member are then raised simultaneously, thereby forcing upward the lower sidewall of the tire carcass and distorting the tire carcass until it is forced out of the grasp of the lower matrix.

The cylindrcial rim is provided with means whereby pneumatic pressure may be applied internally of the tire carcass to force it into engagement with the matrices and sidewall members. Although vulcanizing is primarily accomplished by the application of heat to the mold and matrices, the cylindrical rim is desirably provided with heating means whereby the fluid inside the tire carcass may be heated, thus accelerating vulcanization and minimizing heat losses. In addition, each sidewall member is desirably provided with heat-exchange means whereby the sidewall members may be kept relatively cool during the vulcanizing operation. This prevents discoloration of white sidewall tires.

The invention may be best understood by detailed reference to the drawings, in which:

Figure 1 is a top plan view of the modified molding apparatus;

Figure 2 is a partial sectional view taken on line 2—2 of Figure 1;

Figure 3 is an enlarged sectional view similar to that in Figure 2, but showing an assembled modified form of the molding apparatus;

Figure 4 is a partial sectional view of an assembled, further modification of improved molding apparatus;

Figure 5 is an enlarged sectional view of a modified form of sidewall member of the improved molding apparatus;

Figure 6 is an elevational view and partial section of a modified form of the improved molding apparatus;

Figure 7 is a top sectional view taken on line 7—7 of Figure 6.

Referring now in detail to Figures 1 and 2, the modified clamshell mold comprises an upper back mold piece 11 and a lower back mold piece 12. An upper tread matrix 13 is secured within the upper back mold piece 11, and a corresponding lower tread matrix 14 is secured within the lower back mold piece 12. Each of the back mold pieces is sufficiently extensive to embrace all of the tire carcass over which additional rubber is normally applied, and to extend a short additional distance along the sidewalls. The entire mold is supported by a suitable support means engaging the lower back mold piece 12, such as a circular metallic skirt, or a conventional hydraulic mounting (not illustrated).

The lower portion of the tubeless tire carcass, to which new rubber is not normally applied, is engaged and restrained against movement during vulcanization by the upper sidewall member 15 and the lower sidewall member 16. The sidewall portions of the tire normally engage these sidewall members 15 and 16 and abut against the outer surface of the cylindrical rim 17 in a loose engagement. For convenience in inserting the cylindrical rim 17 within the carcass, the upper edge 19 of the rim is chamfered.

The upper sidewall member 15 and the lower sidewall member 16 are each supported in place during the vulcanizing operation, against the expansive force of the fluid pressure within the carcass, by seating against the corresponding matrix. The edges of each matrix are desirably cut at an angle which is preferably in the range of about 30° to about 60° from the horizontal, a 45° angle being preferred. Thus, the lower sidewall member will normally be supported by the angularly cut edge of the lower matrix 14. However, the upper sidewall member, although it is restrained in position during vulcanizing by the angularly cut edge of the upper matrix 13, is not normally supported in position by this edge of the matrix. In order to hold it in place, a variety of simple fastening means may be employed. For example, as illustrated in Figure 3, the upper back mold piece 11 may be provided with a supporting bracket 35, secured in place by a bolt 36, and projecting over the upper sidewall member 15. An adjusting bolt 31 projecting through the bracket 36 may be provided with a toe 38 resting in a slot 39 in the upper sidewall member. Adjustability of the position of the upper sidewall member may be obtained by providing a wing nut 34 which would normally rest on the upper surface of the supporting bracket 35.

The back mold pieces and sidewall members thus provide for a complete engagement of the exterior surface of the tire carcass. The expansible cylindrical rim 17 provides for complete enclosure of the carcass in the mold. The rim 17 is mounted for axial movement relative to the mold on a plurality of hydraulic pistons 48 which are secured to the lower back mold piece 12 by a bracket 46, which is attached to a corresponding plurality of collars 47 which surround each hydraulic cylinder. A flange 17' protruding outwardly from the extreme lower surface of the cylindrical rim functions as a stop during upward movements of the rim, and indicates to the operator when the cylindrical rim has been raised into vulcanizing position. When the rim is raised beyond the normal operating position for the purpose of ejecting the tire carcass from the open mold, the flange 17' also causes upward movement of the lower sidewall member.

During the vulcanizing operation, the internal fluid pressure applied to the tire carcass exerts a natural expansive force which tends to force the upper and lower mold halves apart. This tendency is overcome by providing a plurality of securing means around the outer periphery of the mold. This desirably may take the form of a group of large bolts 41 which are mounted at spaced intervals around the circumference of the lower back mold piece 12 on rotatable swivels 42. Spaced around the circumference of the upper back mold piece 11 may be a corresponding plurality of juxtapositioned channels 44 adapted to receive the bolts 41 and to restrain axial movement of the two mold pieces through the tightening of suitable nuts 43 on the bolts 41.

The cylindrical rim 17 is also desirably provided with a steam chamber 20, as shown in Figure 3, so that the rim may be heated during the vulcanizing operation. This prevents the loss of heat from the mold, and also imparts to the compressed air within the tire carcass, thus accelerating vulcanization. The compressed air line to the tire carcass may consist of a simple valve and access line 22 passing through the cylindrical rim.

In order to provide an effective seal against air leakage during the vulcanizing operation, the cylindrical rim is desirably constructed in such a way as to be expansible against the undersurface of the bead portions 32 of the tire carcass. A most effective seal may be obtained by providing a sealing ring 33, having the cross-sectional shape of a cup washer, in each of the two recesses 34 in the cylindrical rim 17. Each of these sealing rings will be in the form of a continuous circular strip extending in unbroken fashion entirely around the outer circumference of the cylindrical rim at a point where the bead portion 32 of the tire carcass abuts. The application of compressed air in the recesses 34, under the sealing rings, through a simple conduit 23 through the cylindrical rim, causes each sealing ring to expand against the bead portion 32 of the tire carcass with sufficiently good contact to obtain a pneumatic seal. Preferably, the sealing rings 33 are of a resilient, flexible material which follows the contours of the tire carcass and forms a tight pneumatic seal under a very low air pressure in the recesses 34. Vinyl plastics, rubber, and similar materials are suitable for use as the resilient material in the rings 33.

Ordinarily, during the vulcanizing operation, air pressure would be applied in the recesses 34 to expand the sealing rings against the bead portions of the tire carcass. Almost immediately, air pressure would be applied to the interior of the tire carcass. The internal air pressure in the tire carcass would force the carcass, and the applied camelback, against the matrices and sidewall members, and at the same time would force the bead portions 32 into even closer engagement with the sealing rings 33. Usually, the clearance between the bead portions 32 and the cylindrical rim 17 is only sufficient to facilitate positioning of the carcass over the rim. In many cases, the application of pneumatic pressure to the interior of the tire carcass will force the beads into a very tight engagement with the sealing rings 33, and may form a seal in the absence of any pressure applied in the recesses 34. However, the application of pressure in the recesses 34 is essential to ensure a pneumatic seal in all cases.

While sealing rings 33 of the form just described are very satisfactory, a somewhat greater degree of flexibility of use with carcasses having differing bead-to-bead measurements may be obtained with the embodiment of the invention illustrated in Figure 3. In this embodiment of the invention, the cylindrical rim 17 is provided with a single surface portion of expansible, resilient material 33', which is secured to the cylindrical rim around its upper and lower periphery and at the point where the compressed air valve 22 passes through the cylindrical rim to admit air to the interior of the tire carcass. This resilient material, or diaphragm, is desirably mounted over a plurality of regularly spaced channels 36 in the recessed portion of the cylindrical rim. The application of pneumatic pressure to these channels will cause an expansion of the diaphragm 33', which will engage the bead portions 32 of the tire carcass and form a tight pneumatic seal. The plurality of channels 36 cause an equalization of the pressure on the diaphragm 33 over the entire undersurface of the diaphragm. The embodiment of the invention illustrated in Figure 3 is particularly advantageous in vulcanizing operations involving tires having different bead-to-bead sizes, since the exact points at which the bead portions 32 engage the diaphragm 33' are relatively unimportant.

A further embodiment of the invention is illustrated in Figure 4, in which two separate diaphragms 33'' are provided, one opposite each juxtaposed bead portion 32. In this embodiment of the invention, the two separate diaphragms 33'' are each secured at their upper and lower edges to the cylindrical rim 17 by any conventional securing means. Compressed air may be admitted into the recesses 34" behind the diaphragms in order to expand them into sealing contact with the bead portions of the tire carcass.

With reference to Figure 5, the installation of matrices of different sizes in the mold is a somewhat lengthy task. Therefore, in order to accommodate a variety of different tires (of the same nominal size) in a single standard mold, it is desirable to provide a further improvement and modification in the invention. Where a tire is being recapped which is somewhat small for the matrices in the mold, the tendency of the sidewalls to move outwardly under vulcanizing pressure tends to impress the bead portions of the tire more deeply into the resilient member on the surface of the cylindrical rim. The average or "small" carcass therefore presents no difficulties. However, where the tire carcass is slightly large for the matrices employed, the expansive tendencies of the sidewalls of the tire must be controlled in order to avoid distortion at the crown portion of the tire, in order to ensure proper alignment of the carcass against the matrices, and in order to obtain a good pneumatic seal against the cylindrical rim. This may be accomplished, as is illustrated in Figure 5, by providing a facing 203 over each of the upper and lower sidewall members. The facing 203 is desirably shaped to follow the contour of the sidewall members, and is secured thereto by a plurality of bolts 204 or other securing means. The use of the facings 203 offers several advantages. A primary advantage is that the bead portions of a relatively large tire are properly seated, thus eliminating distortion at the crown portion of the tire and providing proper, full engagement of the matrices by the tire crown. Secondly, the facings ensure a symmetrical disposition of the carcass with respect to the cylindrical rim, which enhances the pneumatic seal which is obtained and also ensures proper alignment of the carcass within the mold.

In a still further embodiment of the expansible rim, as illustrated in Figures 6 and 7, the cylindrical rim 17' may be a relatively rigid metallic member provided with a gap 211 in the rim. Mounted around the exterior surface of the cylindrical rim 17', in a suitable recess, is an insert of flexible resilient material 633, which is a continuous band secured to the rim at only one point around the periphery of the rim by a plurality of bolts 634, which are in vertical alignment with the air inlet 622. The resilient band 633 remains in position on the cylindrical rim because it is seated within the recess in the exterior surface of the rim. In order to expand the flexible band against the bead portions 32 of the tire carcass, it is merely necessary to cause expansion of the rim by the operation of a cam 210 against two stop blocks 209 through a lever 212. This embodiment of the invention provides a very effective seal and is extremely simple in its operation and construction.

In conducting a vulcanizing operation, a tire carcass 19 having camelback applied thereto is inserted in an open mold. This is most easily accomplished when the cylindrical rim 17 is lowered by a withdrawal of the hydraulic piston 49 into its housing 48. Since the clearance between the bead portion of the tire and the surfaces of the cylindrical rim is very small, it is generally easier to place the tire carcass in the lower half of the mold than it is to place it first over the rim. With the carcass properly positioned in the lower half of the mold, the cylindrical rim may generally be inserted into the carcass with very little trouble, since the mold tends to position and center the tire carcass properly. In addition, the lower sidewall member acts as a bearing surface for the cylindrical rim as it moves in an upward direction. The clearance between the rim surface and the bead portions of the tire should be considerably larger, preferably on the order of 1/32 of an inch, in order to allow for easy insertion and withdrawal of the cylindrical rim.

After the cylindrical rim has been raised into position, the upper half of the mold and the upper sidewall member may be lowered into contact with the tire carcass. After the bolts 41 have been tightened so as to maintain the mold halves in close assembly during the vulcanizing operation, internal pressure is applied to the the tire carcass through the conduit 22 in the cylindrical rim. The internal pressure forces the carcass 19 against the matrices, and forces the sidewalls and bead portions of the tire in an outward radial direction. Simultaneously with the application of air pressure to the interior of the tire carcass, or preferably immediately prior thereto, the rim surface is expanded into sealing relationship with the bead portions of the tire carcass.

In order to raise the tire to vulcanizing temperature, steam may be passed through the steam chambers in the back mold pieces and through the chambers 20 in the cylindrical rim 17. Since the tire is completely enclosed by the back mold pieces, the sidewall members, and the cylindrical rim, much higher pressures may be employed in the present improved vulcanizing apparatus than are now customary in recapping processes. For example, pressures of 160 to 180 p. s. i. give very satisfactory results in this apparatus, as contrasted with pressures of 125 p. s. i. which are normally employed in conventional apparatus. When sufficiently hot steam is employed to cause the crown temperature of the carcass to be in the range of about 280° F. to about 310° F., at the high pressures employed in this process, vulcanization may be completed within 25 to 30 minutes.

After vulcanization has been completed, the compressed air is allowed to escape from the interior of the tire, and the upper mold half may be raised. In the apparatus illustrated in the present application, the tire carcass will practically never remain with the upper half of the mold, since any movement of the carcass immediately causes a binding action of the beads on the cylindrical rim which prevents movement of the carcass.

In order to remove the carcass from the mold, the cylindrical rim is caused to rise vertically by movement of the hydraulic pistons 49. The flange 17', protruding from the lower portion of the cylindrical rim 17, carries with it as it rises the lower sidewall member 16, which exerts sufficient pressure on the carcass to distort it and force it out of the lower matrix 14. Once the carcass has been forced away from the matrix, the cylindrical rim can be lowered as far as it will go, and it will slide free of the tire carcass with no binding action.

Where a white sidewall tire is being recapped by the process and apparatus described in this application, it has been found desirable to circulate cold water through the channels 9 and 10 respectively provided in the sidewall members 15 and 16. This keeps the sidewalls cool during the vulcanizing operation, and prevents discoloration of the white sidewalls.

The foregoing specification is intended to be illustrative of the invention, and should not be construed as limiting the invention in any way. It is to be understood that various modifications may be made in this invention within the scope of the art. Thus, the apparatus which has been described may be employed in vulcanizing processes over a wide range of temperatures and pressures, and it should be understood that the operation need not be confined to those temperatures and pressures specifically mentioned in this specification. The temperatures and pressures described produce excellent vulcanizing operations in a minimum amount of time. However, the process may be employed at other temperatures and pressures where conditions make such temperatures and pressures desirable, with a difference in the time necessary for vulcanizing.

The present invention is related to the invention described in my copending application, Serial No. 486,594, filed February 7, 1955.

I claim:

1. A molding apparatus for applying a new wearing surface to a tire carcass comprising a carcass-receiving mold, a cylindrical rim movable axially with respect to said mold and having an expansible resilient member disposed upon the exterior surface thereof in abutting disposition with a bead portion of the carcass, means to expand said resilient member into sealing contact against the abutting bead portions of the carcass, means to raise the mold and carcass to vulcanizing temperature, and means to apply fluid pressure to the interior of the carcass whereby the carcass is forced against the mold and the bead portions are forced into sealing engagement with the resilient member of the cylindrical rim.

2. The molding apparatus of claim 1 in which said cylindrical rim is provided with heat-exchange means, whereby the rim and the fluid under pressure on the interior of the tire carcass may be heated.

3. The molding apparatus of claim 1 in which the portions of the mold adjacent the side walls of the tire carcass are provided with heat-exchange means whereby that portion of the mold may be selectively cooled during vulcanization.

4. The molding apparatus of claim 1 wherein the cylindrical rim is provided with an inwardly chamfered upper periphery for ease in forcing the tire carcass over the rim.

5. The molding apparatus of claim 1 wherein said expansible resilient member comprises a pair of flexible, resilient circular bands of channel-shaped cross-section, each band being seated within a recess in the cylindrical rim so positioned that the band abuts against the bead portions of the tire carcass, each recess being provided with a compressed air inlet whereby the band may be forced into sealing contact with the abutting bead portions of the carcass, the flanges of the channel-shaped cross-section of each band embracing the walls of the recess, whereby a cup-washer effect is obtained.

6. The molding apparatus of claim 1 wherein said expansible resilient member comprises a flat band encircling the cylindrical rim and seated within a recess therein, said rim being provided with a compressed air inlet whereby compressed air may be admitted between said band and the underlying surface of said recess to force the band into sealing engagement with the abutting bead portions of the tire carcass, said band being secured to the cylindrical rim along its upper and lower edges.

7. The molding apparatus of claim 1 wherein said expansible resilient member comprises a pair of flexible resilient bands secured at their upper and lower edges within recesses in the face of said cylindrical rim, said bands being so positioned as to abut against the bead portions of the tire carcass when expanded, and said rim being provided with means whereby compressed air may be admitted between each of said bands and the rim whereby said bands may be expanded into sealing relation with said bead portions of the tire carcass.

8. A molding apparatus for applying new rubber to a tire carcass comprising a carcass-receiving mold, a cylindrical rim movable axially with respect to said mold, said cylindrical rim having a gap therein whereby said rim may be readily expanded, an expansible resilient member disposed upon the exterior surface of said cylindrical rim, and means to enlarge the diameter of said rim, whereby said resilient member may be forced into sealing contact with the abutting bead portions of a tire carcass seated within the mold, means to raise the mold to vulcanizing temperature, and means to apply fluid pressure to the interior of the carcass whereby the carcass is forced against the mold and the sealing engagement between the bead portions of the carcass and the resilient member on the cylindrical rim is enhanced.

9. A tire molding and vulcanizing apparatus comprising a carcass-receiving mold, a carcass seated therein, a cylindrical rim movable axially with respect to said mold enclosing said mold in such a position that the bead portions of the carcass abut against the exterior surface of said cylindrical rim, an expansible resilient member disposed upon the exterior surface of said cylindrical rim in juxtaposition with the bead portions of the carcass, means exerting fluid pressure on the interior of the carcass whereby it is expanded against the mold, heat-exchange means at the crown of the tire adapted to heat that portion of the tire to vulcanizing temperature, independent heat-exchange means at the side wall region of the tire adapted to cool that portion of the tire selectively during the vulcanizing operation, and means to expand said resilient member into sealing contact against the abutting bead portions of the tire carcass.

10. A sectional molding apparatus for vulcanizing camelback to pneumatic tires comprising a crown mold section having a tread-imparting matrix, separate side wall members completing the carcass-receiving mold and embracing the side wall portions of the carcass to which camelback is not being applied, a cylindrical rim in axially movable relationship to said mold, said cylindrical rim having an expansible resilient member disposed upon the exterior surface thereof in juxtaposition with the bead portions of the tire carcass, means to apply fluid pressure to the interior of the carcass to expand the carcass against the mold, means to heat the crown mold section to vulcanizing temperature, means to force said resilient member into sealing engagement with the bead portions of said tire carcass, and means associated with at least one of said side wall members whereby it may be employed to eject the vulcanized tire from the mold.

11. A molding apparatus for vulcanizing pneumatic tires comprising a sectional crown mold having heat-exchange means whereby that portion of the mold may be raised to vulcanizing temperature, separate side wall members securable to said crown mold, a cylindrical rim mounted in axially-movable relationship with respect to said mold, said rim having an expansible resilient member disposed upon the exterior surface thereof in juxtaposition to the bead portions of the tire carcass, means to expand said resilient member into abutting sealing contact with the bead portions of the tire carcass, means to apply fluid pressure to the interior of the carcass to expand the carcass against the cylindrical rim, the lower of said side wall members being removably supported by the matrix of the lower portion of said crown mold, the lower of side wall members being removably supported on a flange protruding from the lower extremity of said rim, said lower side wall member being movable axially relative to said mold while supported on said flange whereby said side wall member may function as a tire ejector.

12. In a method for vulcanizing an increment of tread rubber to a pneumatic tire that has a central opening, the improvements comprising placing a preformed tire that has an increment of tread rubber applied thereto in a mold that embraces the crown and sidewall portions of the tire, projecting cylindrical sealing means through said central opening of the tire in axial alignment with said tire, expanding said sealing means outwardly from the cylindrical axis thereof to engage the outside surface of the bead portions of said tire in fluid tight relation, and expanding said tire by internally applied fluid pressure.

13. In a tire tread apparatus for vulcanizing new rubber to a tire comprising a sectional mold that is formed with annular mold members that are removably positioned together and that are provided therebetween with a cavity that is adapted to receive a performed tire that has new rubber applied thereto, said mold including a crown section having a tread-imparting matrix disposed for contact with the new rubber and also having sidewall members extending respectively from said crown section, said mold being formed to mold to the crown and sidewall portions of the tire the new rubber that is applied thereto, the improvement comprising: said mold being formed with an opening that is cylindrical about an axis that coincides with the axis of said mold cavity and with which said cavity communicates, a cylindrical rim mounted to reciprocate axially of said mold in said opening, expansible resilient sealing means disposed upon the exterior surface of said rim, and means to expand said sealing means to engage the outer surfaces of the bead portions of said tire in fluid tight relation, whereby said tire may be expanded against the mold by fluid pressure that is developed directly within said tire.

References Cited in the file of this patent

UNITED STATES PATENTS

| | | |
|---|---|---|
| 1,375,542 | Traum | Apr. 19, 1921 |
| 2,020,023 | Flynn | Nov. 5, 1935 |
| 2,597,550 | Tritt | May 20, 1952 |

FOREIGN PATENTS

| | | |
|---|---|---|
| 71,296 | Sweden | Mar. 3, 1931 |